Nov. 15, 1960  F. C. ARMISTEAD  2,960,608
RADIOLOGICAL WELL LOGGING
Filed April 27, 1956
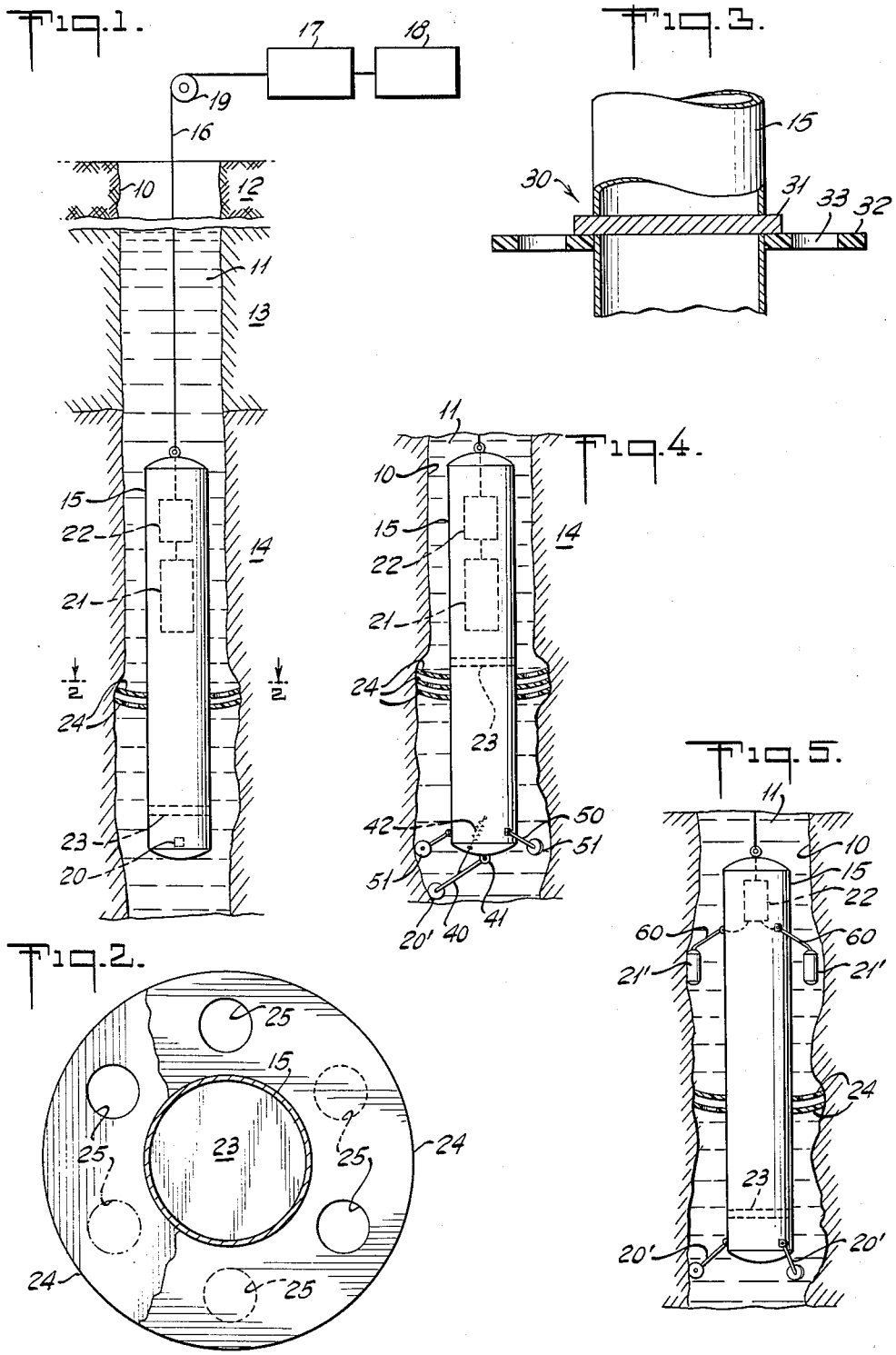

ated Nov. 15, 1960

2,960,608
RADIOLOGICAL WELL LOGGING

Fontaine C. Armistead, Richmond, Va., assignor to Texaco Development Corporation, New York, N.Y., a corporation of Delaware Filed Apr. 27, 1956, Ser. No. 581,021

7 Claims. (Cl. 250—83.3)

The present invention relates generally to the logging of bore holes or wells through the earth by means of a source of radioactivity and a detector. More particularly, the invention relates to improvements in neutron logging in which a source of neutrons is employed to bombard the earth formations traversed by the bore hole, and scattered or slow neutrons or gamma-rays induced in the formations by neutron bombardment are measured in order to provide information as to the nature of the formation.

As is generally well-known, there are two types of so-called "neutron" logging. In one method a source of neutrons and a detector for neutrons disposed within a logging instrument or housing are passed through the bore hole. Neutrons from the source pass outwardly into the formations around the hole and, depending upon the nature of the formation bombarded, more or less of the neutrons are scattered within the formation, some of the neutrons passing back into the hole to strike the detector. In the other method, a source of neutrons and a gamma ray detector disposed in a housing are passed through the bore hole and a measurement is made of the intensity of gamma rays induced in the formations by the neutron bombardment. For purposes of brevity, the first of these methods will be referred to as the neutron-neutron method, indicating that neutrons pass out into the formations and that neutrons come back into the hole and are measured. The second method will be referred to as the neutron-gamma method, indicating that neutrons pass outwardly into the formations to induce gamma rays therein, some of which gamma rays pass back into the hole to be detected.

One of the most serious difficulties in neutron-neutron and neutron-gamma ray logging is due to the influence of the fluids in the bore hole between the source of neutrons and the formations and between the source and detector. Fluid between the formation and detector is also of concern. The fluid normally contained within a bore hole is often hydrogenous oil or water or, more frequently, the drilling mud used in the drilling of the bore hole. The penetration of neutrons through the hydrogen-containing fluids to the formation is rather limited and as a result substantial changes are produced on the logs when changes occur in the diameter of the well. Even in the case of a bore hole of uniform diameter, i.e., with a constant amount of fluid between the earth formation and logging instrument there is ordinarily a detrimental effect on the neutron log due to the presence of the fluid. For example, the hydrogen of the well fluid causes rapid slowing down of the fast neutrons from the source, thus raising the slow neutron flux at the detector. At the same time, the hydrogen of the well fluid causes the absorption of the slowed-down neutrons with the subsequent emission of characteristic capture "gamma rays." Thus, in the case of the neutron-neutron log, where the slow neutron flux is the quantity measured, or in the case of the neutron-gamma log where the quantity measured is the gamma flux, it will be seen that the kind of well fluid, diameter of the bore and separation of source and detector, all effect the observed quantity.

Various suggestions have been made in the past for minimizing the effect upon a neutron log of variations in well fluid content due to changes in bore hole diameter. For example, it has been proposed to displace the bore hole fluids by means of a non-hydrogenous material. A method and apparatus involving this technique is set forth, for example, in U.S. Patent #2,652,496, issued September 15, 1953, to Gerhard Herzog et al. Another patent concerned with displacement of the hydrogen containing fluid of a bore hole is Patent #2,509,908 issued May 30, 1950, to K. C. Crumrine. Both of these patents are concerned with proposals for eliminating adverse effects for bore hole fluid by displacement thereof with a non-hydrogenous, i.e., neutron-permeable material.

Although the aforementioned techniques for minimizing the effects of bore hole fluid on a neutron log are of value; nevertheless, it is considered desirable in many instances to provide means for further inhibiting the effects on the neutron log of slow neutrons or thermal neutron produced in the bore hole fluid by the source.

It is a general object of the invention to provide improvements in well logging employing a neutron source in the presence of a hydrogenous well fluid.

It is still another object of the invention to provide improvements in neutron shielding for neutron well logging apparatus.

It is still a further object of the invention to provide improvements in neutron shielding apparatus in combination with means for positioning a well logging instrument in a well bore.

Briefly stated, in accordance with one aspect of the present invention, there is provided a well logging device comprising an elongated instrument housing adapted to be lowered and raised through the hole and which contains a radiation detector at one end thereof and a source of neutrons at the other end. Intermediate the source and the detector, there is provided a neutron shield comprising one or more neutron absorbing membranes adapted and arranged to surround the housing in such manner as to contact the sides of the bore hole, thereby preventing thermal neutrons present in the fluids due to the source from being transmitted to the detector. In certain embodiments resilient means are provided for continuously urging the source and/or the detector outwardly from the housing toward the wall of the well.

Preferably, the neutron absorbing shield comprises a plurality of resilient membranes being provided with a plurality of holes, the holes in successive ones being in off-set relation with respect to those of adjacent membranes, whereby bore hole fluids are permitted to pass through the shield as the housing is moved through the well without reducing the effectiveness of the shield.

For additional objects and advantages, and for a better understanding of the invention, attention is now directed to the following description and accompanying drawing. The features of the invention which are believed to be novel are particularly pointed out in the appended claims.

Referring to the drawings:

Figure 1 is a vertical sectional elevation through an earth bore hole showing a logging instrument suspended in a bore hole containing a hydrogenous bore hole fluid;

Figure 2 is a plan view, partly in cross-section, taken through the lines 2—2 of Figure 1;

Figure 3 is a side elevational view, partly in cross-section, of a portion of a well logging apparatus including a modified form of the neutron shield shown in Figure 1;

Figure 4 is a side elevational view, partly in cross-section of a portion of an earth bore hole containing a further embodiment of the logging apparatus as set forth in Figure 1; and, Figure 5 is a side elevational view, partly in cross-section of a portion of an earth bore hole containing still another embodiment of the logging apparatus as set forth in Figure 1.

Referring now to Figure 1, there is shown a bore hole 10 containing the usual hydrogenous bore hole fluid 11 and which traverses a series of earth formations 12, 13, 14, about which logging information may be desired. Within the bore hole 10 there is shown a logging instrument or housing 15 suspended therein as by means of a cable 16 which may also provide means for electrically coupling the instrument to electrical apparatus at the surface. For example, the cable 16 may electrically couple the instrument 15 to a suitable amplifier 17 which, in turn, may be coupled to a recorder 18, as shown. A measuring device 19 is shown in contact with the cable 16 for determining the length of the cable 16 lowered into the bore hole 10 at any given time.

The instrument 15 may be formed in accordance with known techniques to withstand the pressures encountered within an earth bore. The instrument 15 is provided at its lower end with a suitable neutron source 20, such as a conventional radium-beryllium source. As is well-known in the logging art, typical neutron sources employed as a source of primary radiation in neutron logging, such as the aforementioned radium-beryllium source, produce neutrons by bombardment of a suitable target with a source of alpha rays. Sources of this type also generally emit gamma-rays along with the desired neutrons. Within the upper end of the housing 15, remote from the source 20, there is shown a radiation detector 21 which may appropriately be a proportional counter such as that referred to in the aforementioned patent to Gerhard Herzog et al., or which alternately may comprise other known type of detector suitable for the detection of the desired neutron and/or gamma radiation, as determined by the specific type of log being made. The output of the detector 21 may be coupled to suitable circuitry, such as the pre-amplifier 22 for enhancing the output thereof for transmission to the surface instruments 17, 18 as by means of the cable 16.

Within the housing 15 generally intermediate the source 20 and the detector 21 there is provided a suitable radiation shield member 23 which may be formed of lead or the like for preventing gamma rays produced by the source from reaching the detector 21. Surrounding and attached to the body of the housing 15 there is provided a shielding member 24 of generally circular configuration in order to conform to the cross-sectional area between the instrument 15 and the bore hole 10 and which is formed of appropriate thermal-neutron shielding material in order to prevent the transmission to the detector of thermal neutrons produced in the fluid by the source 20. The shield member 24 is appropriately formed of resilient material, thereby resiliently to contact the sides of the bore hole 10 as the instrument 15 is drawn through it, despite variations in bore hole diameter from place to place along its length.

A preferred embodiment of the shield member 24 comprises a flexible disc or membrane of rubber-like material impregnated with thermal-neutron capturing material. Thus, it is obvious that the flexible disc or membrane serves as a resilient matrix for the neutron absorbent material. Specifically, it is preferred to employ a disc comprised of neoprene impregnated with boron or cadmium. Preferably a plurality of disc members 24 are employed in order to assure the desired degree of flexibility consistent with a shield having the desired thermal-neutron stopping power. The shielding members should preferably be mounted on the logging tool in planes perpendicular to the longitudinal axis of the logging tool, as illustrated in the drawing. As an indication of the effectiveness of a shield as herein described, and as an example of a preferred embodiment, it is pointed out that a shield of neoprene impregnated with approximately 150 milligrams of boron carbide per square centimeter is capable of reducing the slow-neutron intensity by a factor of about 100.

Preferably, as may be seen by reference to Figure 2, the shield member 24 should be provided with a plurality of apertures 25 in order to permit the well fluid 11 to pass by the instrument and shield 24 as the instrument 15 is moved through the well. In order to provide adequate shielding while, nevertheless, permitting movement of fluid past the housing 15, the apertures 25 of adjacent discs 24 should be positioned in staggered or offset relation with respect to one another.

Referring now to Figure 3, there is shown another form of neutron shield 30 mounted on a logging instrument 15 and which comprises a generally annular rigid inner portion 31 of boron steel, for example, having mounted in overlapping, contiguous relation thereto an outer annular portion 32 in the form of a resilient flexible member, such as the boron or cadmium impregnated neoprene member illustrated in Figures 1 and 2. In this embodiment of the invention, the flexible outer annular member 32 may be provided with a plurality of apertures 33 corresponding to the apertures 25 shown in the apparatus of Figures 1 and 2. As in the case of the apparatus of Figures 1 and 2, the plurality of annular members should preferably be provided with their respective apertures 33 in offset or staggered relationship.

Referring now to Figure 4, there is shown a modified version of the logging apparatus illustrated in Figure 1, wherein a modified mounting arrangement for the source is provided and which affords the advantage of mounting the source at a substantially constant distance from the side of the well bore throughout the logging operation. In this embodiment, the source 20' is shown mounted to the housing 15 in such manner that it is continuously urged outwardly from the axis of the housing and against the wall of the bore hole 10. In particular, this may be accomplished as shown by mounting the source 20' at one end of a supporting member 40 having its opposite end pivotally mounted to the bottom portion of the instrument housing 15 as by means of a pivot 41. The supporting member 40 may be continuously urged outwardly against the side of the bore hole as by means of the spring tensioning member 42 coupled between an intermediate point on the member and the housing. In order to assure that the instrument remains generally concentrically positioned within the well bore hole during the logging operation, despite the pressure of the detector outwardly against the side of the bore hole, it is considered desirable to provide additional centering means for the instrument as, for example, a generally spider-like centering assembly which may comprise a plurality of arm members 50 disposed around the instrument 15 extending outwardly therefrom and having smooth contacting members 51 affixed to the end thereof remote from the housing 15. Three (3) arm members 50 is ordinarily adequate, although additional ones may be employed.

Although the spider-like assembly and the source mounting have been shown in Figure 4 as separate assemblies, nevertheless, it is further contemplated that the source may be mounted at one end of one of the legs or arms 50 of the spider-like centering assembly, in place of the contacting member 51. In such case, the remaining arms 50 of the spider-like assembly function solely as stabilizers, while the spider-like source arm has a dual function, namely, that of stabilization and mounting for the source.

In accordance with a further aspect of the invention, it is contemplated to provide a plurality of sources, for example three, each of which are positioned at the end of one of the arms or legs of the spider-like centering assembly.

The method of mounting the source, or more particularly, a plurality of sources, at the ends of a spider-like assembly that also functions to center the logging instrument is illustrated in Figure 5, for example. Figure 5 also discloses further features with regard to the detector in such a logging assembly.

Referring now to Figure 5, there is shown still another embodiment of the invention incorporating the method of mounting the source 20' illustrated in Figure 4 and further incorporating a method of mounting one or more detectors 21' in similar relation with respect to the side of the bore hole. More particularly, each of the detectors 21' is continuously urged outwardly against the side of the bore hole by means of a mounting member 60 similar to that employed for mounting the source 20'. In addition to the means for mounting the source 20' for continuous contact with the side of a well bore, resilient spider-like means are also provided for continuously centering the upper portion of the logging instrument in order to neutralize the pressure which may be exerted on the side of the bore hole by the detector mounting mechanism. As in the case of the source(s) 20', individual detectors are shown mounted at the end of each of the arms or legs of the upper centering assembly. The use of a plurality of detectors in this environment affords certain unique advantages. By this arrangement, for example, slight variations of the position of the individual detectors with respect to the sides of the bore hole will be neutralized by an averaging effect, thus minimizing the effect of the well fluid on the detected signal. In this arrangement the outputs of the individual detectors may be coupled to a common electrical circuit, as by means of a common input circuit to the preamplifier.

As will be appreciated by those skilled in the art, certain advantages follow from the aforementioned method of mounting the source and detector in contact with the bore hole, in combination with the above-described resilient neutron shielding member. For example, it is pointed out that in addition to preventing those neutrons slowed down in the well fluid from getting to the detector, such an arrangement further avoids the various effects of well fluid on the neutrons that go out from the source into the formation and, likewise, upon those neutrons returning from the formation to the detector.

While certain specific embodiments have been shown and described, it will be understood that various modifications may be made without departing from the principles of the invention. The appended claims are, therefore, intended to cover any such modifications within the true spirit and scope of the invention.

I claim:

1. In combination with apparatus for logging subsurface earth formations traversed by a bore hole containing an hydrogenous fluid, said apparatus comprising an elongated instrument housing adapted to be passed through the bore hole, a source of neutrons, and a detector of secondary radiation positioned in spaced relation along the longitudinal axis of the instrument, the improvement comprising a flexible thermal neutron absorbing shield of generally annular configuration surrounding and attached to said housing intermediate the source and the detector for preventing neutrons resulting from said source from passing through the well fluid toward said detector, the outer edge of said shield having substantially the same circumference as the bore hole whereby the shield is adapted and arranged to provide effective shielding and to centralize the instrument housing in the bore hole.

2. Apparatus according to claim 1 wherein the thermal neutron shield comprises a plurality of flexible members of generally annular configuration formed of a resilient matrix impregnated with a slow neutron absorbent material.

3. Apparatus according to claim 2 wherein the thermal neutron absorbent material is boron carbide.

4. A device as in claim 2, wherein the individual shield members are provided with a plurality of apertures and wherein the apertures of adjacent members are in offset relation with respect to one another, whereby well fluid is permitted to pass the housing as it is moved through the bore without interrupting the effectiveness of the shield.

5. Apparatus according to claim 1 wherein both the source and detector are mounted within the instrument housing.

6. Apparatus according to claim 4 wherein the source and detector are mounted within the instrument housing.

7. Apparatus according to claim 1 further including resilient means for continuously urging at least one of said detector and source outwardly from the housing toward the side of the well bore.

References Cited in the file of this patent
UNITED STATES PATENTS

| | | |
|---|---|---|
| 2,385,378 | Piety | Sept. 25, 1945 |
| 2,778,951 | Tittman | Jan. 22, 1957 |
| 2,842,678 | Silverman | July 8, 1958 |